Sept. 6, 1949. R. E. HARSHMAN 2,480,922
COMBINATION GRASS CUTTER AND EDGE TRIMMER
Filed Sept. 4, 1947
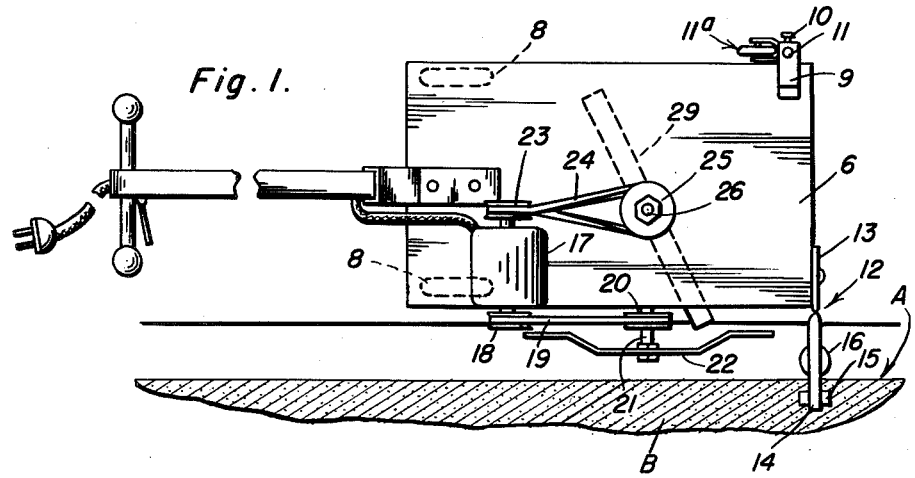
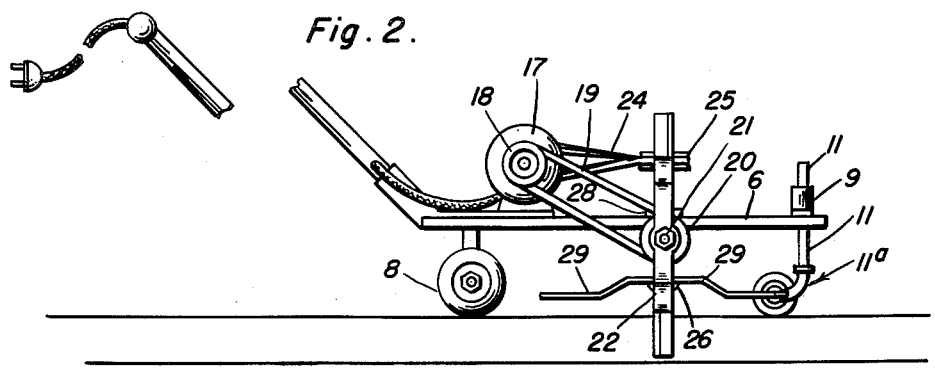
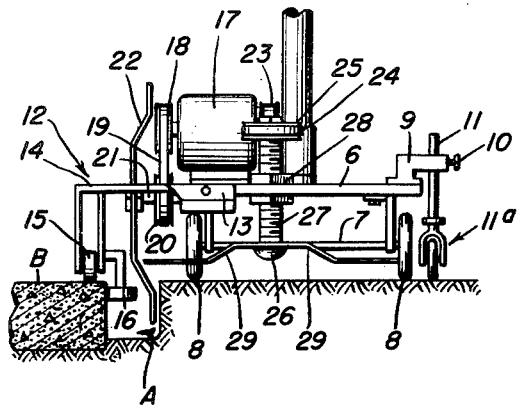
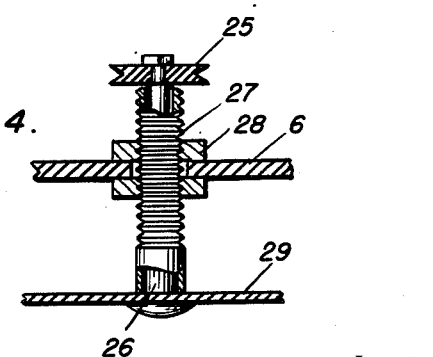
Inventor
Richard E. Harshman
By *Clarence A. O'Brien and Harvey B. Jackson*
Attorneys Patented Sept. 6, 1949

2,480,922

UNITED STATES PATENT OFFICE 2,480,922

COMBINATION GRASS CUTTER AND EDGE TRIMMER

Richard E. Harshman, Scotts Bluff, Nebr.

Application September 4, 1947, Serial No. 772,079

3 Claims. (Cl. 56—25.4)

The present invention relates to lawn-type grass cutting machines and has reference in particular to one which includes a rotary cutter operable in a horizontal plane for cutting the grass proper, and, a vertically disposed rotary complemental cutter, the latter being situated for edge trimming purposes.

More particularly, the invention has reference to a grass cutter and trimmer wherein rotary cutting blades are disposed at right angles to each other and are simultaneously driven from an electric motor which is mounted on a platform for simultaneously operating both cutters.

More specifically, the invention appertains to certain new and useful improvements on a similarly constructed grass cutting machine which is presently disclosed in a co-pending application on an electric edger-type grass trimmer, the latter being embodied in application Serial No. 716,061, filed by me under date of December 13, 1946.

Briefly, the invention covered in the pending application has to do with a handle equipped movable carriage which includes a horizontal platform supported on front and rear rollers and which is adapted to be pushed and maneuvered at a suitable gait by a walking attendant, there being a rotary grass trimming and clipping blade mounted vertically for operation from one marginal side of the platform and this being swingable through a path of rotation in alignment with a ditch, that is a ditch existing between the edge of the lawn and an edge of a sidewalk running alongside of the lawn. A prime mover is situated and mounted atop the platform and has operating connection with the rotary grass clipping and trimming blade and guiding and steering means is mounted on a forward corner portion of the platform and is constructed and located to span the ditch for free moving contact with a longitudinal edge portion of the sidewalk.

By way of comparison, the invention in the instant matter appertains, on the one hand, to a pair of rear wheels substituted for a single rear roller, and a swivelly mounted front wheel or caster which is substituted for a front roller and which is vertically adjustable for raising and lowering the platform and consequently changing the elevational plane of operation of the rotary grass cutter.

Another objective is to employ a single motor with pulleys on both ends, the pulleys serving to accommodate belts and the belts being operatively connected with the rotary grass cutter and edge trimmer or cutter, whereby to simultaneously operate both cutters from the one motor.

Other objects and advantages will become more readily apparent from the following description and the accompanying illustrative drawings.

In the drawings, wherein like numerals are employed to designate like parts throughout the views:

Figure 1 is a top plan view showing the two-way cutter and the manner in which same is constructed and used;

Figure 2 is a side elevational view of the structure seen in Figure 1;

Figure 3 is a front end elevational view, that is a view observing the structure illustrated in Figure 1 in a direction from right to left;

Figure 4 is an enlarged fragmentary sectional view detailing the mounting means for the horizontal rotary cutter.

Referring now to the drawings by distinguishing reference numerals, the stated carriage comprises a horizontal platform of appropriate material and dimensions, the same denoted by the numeral 6. At the rear or trailing end (see Fig. 3) the platform is provided on its underside with hanger brackets for an axle 7 which axle supports freely rotatable ground engaging wheels 8. On the forward right-hand corner portion in Figure 3, I provide a bracket 9 carrying a set screw 10 and supporting the axle 11 of a freely swingable or self-accommodating caster 11a.

The steering and guiding means for keeping the machine in proper kilter in relation to the lawn, ditch and sidewalk, shown in Figures 1, 2 and 3, and for properly advancing the machine in guided relation, is denoted generally considered, by the numeral 12. It comprises an adjustably mounted attaching arm 13 and a horizontal reach arm 14 which spans the ditch A and overlies the longitudinal edge of the concrete sidewalk B. Vertically depending portions on the outer end of the reach arm 14 (see Fig. 3) carry a sidewalk contacting roller 15 which is vertically disposed and rotatable on a horizontal axis. In addition, there is a suitable bracket carrying a horizontal roller 16 turnable on a vertical axis. These rollers, at right angles to each other, ride against the concrete sidewalk and outer wall of the ditch, and accomplish the desired steering results. Incidentally, this steering and guiding means is shown, described and claimed in my co-pending application, Serial No. 716,061, and is therefore, not claimed here.

Attention comes now to the stated prime mover, this being in the form of an electric motor 17 mounted atop the platform. The outwardly projecting shaft of the motor carries a pulley 18 to accommodate a belt 19 which is trained over a pulley 20 on a stub shaft 21, the stub shaft 21 carrying a bladed rotor 22. This motor and pulley arrangement correspond to the same construction covered in the co-pending application. It is obvious that this bladed cutter, turnable on a horizontal axis, constitutes an edge trimmer trimming the marginal portion of the grass, that is, such portions thereof as would overhang the inner wall of the ditch A.

It is an improvement to also provide the motor 17 on the opposite end with a second pulley 23, which pulley operates a belt 24, said belt being twisted between its ends and serving to operate a third horizontally disposed pulley 25. The latter pulley, as shown in Figure 4, is keyed on the upper end of a vertical axle or shaft 26. This shaft is mounted for rotation in a screw threaded bushing or sleeve 27 which, in turn, is adjustably mounted, as at 28, on the platform. The shaft 26 has mounted thereon and keyed thereto a horizontal rotary cutter 29. It follows that the two bladed cutters work at right angles to each other, the innermost one 29 serving to clip and trim that portion of the grass around the lawn which may be designated as the marginal border. The complemental vertical cutter 22 simultaneously travels along and clips or trims the extreme marginal portion of the grass border.

The points of novelty reside in, as before indicated, the two rotary cutters on a single platform of bladed construction driven by pulleys and belts, both belts being operated from a single double pulley-equipped motor. Other novelty is predicated on the platform with brackets tiltably mounted on the wheel supported axle 7, and the caster at the front permitting the corresponding end portion of the platform to be raised and lowered to change the elevation of the horizontal cutter 29, whereby to place it to best advantage for grass clipping results.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A grass cutting machine of dual capacity type which edges and cuts grass close to the vertical lawn-side wall of a walkway ditch and also trims those blades of grass which would otherwise droop and overhang said wall, comprising a wheeled carriage adapted to be wheeled back and forth in close ranging proximity to said lawn-side ditch wall, an elongated mower blade disposed in a horizontal plane and mounted for rotation on a vertical axis on said carriage, said carriage to be wheeled adjacent to the stated wall of said ditch so that the ends of said blade sweep over said ditch by way of an orbital path which ranges partially beyond said wall, a companion mower blade disposed in a vertical plane and mounted for rotation on a horizontal axis on said carriage, said axes and blades being at right angles to each other and said vertical blade sweeping through an orbital path substantially in alignment with and parallel to said wall with its ends projecting, at right angles, beyond and below the plane of operation of the coacting ends of said first-named blade to effectively trim all grass along the stated wall side of said ditch, a prime mover mounted on said carriage, and operating connections between said prime mover and respective blades.

2. A grass cutting machine of dual capacity type which edges and cuts grass close to the vertical lawn-side wall of a walkway ditch and also trims those blades of grass which would otherwise droop and overhang said wall, comprising a wheeled carriage adapted to be wheeled back and forth in close ranging proximity to said lawn-side ditch wall, an elongated mower blade disposed in a horizontal plane and mounted for rotation on a vertical axis on said carriage, said carriage to be wheeled adjacent to the stated wall of said ditch so that the ends of said blade sweep out and over said ditch by way of an orbital path which ranges partially beyond said wall, a companion mower blade disposed in a vertical plane and mounted for rotation on a horizontal axis on said carriage, said axes and blades being at right angles to each other and said vertical blades sweeping through an orbital path substantially in alignment with and parallel to said wall with its ends projecting, at right angles, beyond and below the plane of operation of the coacting ends of said first-named blade to effectively trim all grass along the stated wall-side of said ditch, a prime mover mounted on said carriage, operating connections between said prime mover and respective blades, a pair of freely operable guide and steering rollers engageable with the horizontal and vertical surfaces of the stated walkway and means for spacing and mounting said rollers on said carriage in proximity to said blades to insure proper relationship of the blades to the stated ditch wall and to prevent said vertical blade from slashing into said wall.

3. A grass cutting machine designed to simultaneously cut grass which borders along the vertical lawn-side wall of a walkway ditch and, in addition, clips and trims those blades of grass which would, if not clipped, overhang and droop into said ditch, comprising a carriage embodying a substantially rectangular platform having forward, rearward and left and right edge portions, a pair of ground-engaging wheels suspended from and for supporting the rearward edge of said platform, a prime mover mounted atop said platform, a vertically disposed shaft adjustably mounted on said platform and located slightly off-center, an operating connection between said shaft and prime mover, a horizontally disposed cutter blade disposed beneath said platform and keyed on said vertical shaft, the ends of said cutter blade being adapted to swing beyond the right-hand edge of said platform, a horizontal shaft mounted for rotation in a horizontal plane on the right-hand edge of said platform and projecting beyond said edge, a vertically disposed trimming blade keyed intermediate its ends on said horizontal shaft, the ends of said vertical blade projecting beyond the plane of rotation of the corresponding ends of the first-named blade and being offset so that the ends of the horizontal blade swing beyond the stated wall over the ditch and the ends of the vertical blade swing down into the ditch below the plane of the ground and parallel to said wall, a horizontal reach arm adapted to span the ditch, said reach arm being connected at one end to the forward edge portion of said platform, said arm extending at right angles from the right-hand edge of the platform, a pair of turnable rollers supported from said arm and rotatable on axes at right angles to each other, one roller being adapted to ride a top surface of said walkway and the other to ride a vertical edge portion of said walkway, and a swivel-type caster mounted on the left-hand edge portion of the platform adjacent the forward edge portion of said platform, and an operating connection between said prime mover and said horizontal shaft.

RICHARD E. HARSHMAN.

REFERENCES CITED

The following references are of record in the file of this patent:

UNITED STATES PATENTS

| Number | Name | Date |
|---|---|---|
| 1,026,985 | Irwin | May 21, 1912 |
| 1,651,759 | Felton | Dec. 6, 1927 |
| 1,747,542 | Goldsmith | Feb. 18, 1930 |
| 1,770,434 | Schleicher | July 15, 1930 |
| 1,992,494 | Lundin | Feb. 26, 1935 |
| 2,114,096 | Noel | Apr. 12, 1938 |
| 2,185,659 | Chernow | Jan. 2, 1940 |
| 2,410,196 | Benthall, Sr. | Oct. 29, 1946 |